(12) United States Patent
Hartema et al.

(10) Patent No.: US 12,510,551 B2
(45) Date of Patent: Dec. 30, 2025

(54) AUTONOMOUS SYSTEM FOR GRAIN SAMPLING AND GRADING

(71) Applicants: Jerry Hartema, Alden, IA (US); Richard George Struve, Gilbert, IA (US); Robert Franklin Rasmus, Winterset, IA (US)

(72) Inventors: Jerry Hartema, Alden, IA (US); Richard George Struve, Gilbert, IA (US); Robert Franklin Rasmus, Winterset, IA (US)

(*) Notice: Subject to any disclaimer, the term of this patent is extended or adjusted under 35 U.S.C. 154(b) by 228 days.

(21) Appl. No.: 18/340,170

(22) Filed: Jun. 23, 2023

(65) Prior Publication Data

US 2024/0012015 A1  Jan. 11, 2024

Related U.S. Application Data

(60) Provisional application No. 63/358,894, filed on Jul. 7, 2022.

(51) Int. Cl.
*G01N 35/00* (2006.01)
*G01N 33/10* (2006.01)
*G06T 7/00* (2017.01)
*G06T 7/70* (2017.01)

(52) U.S. Cl.
CPC ......... *G01N 35/0099* (2013.01); *G01N 33/10* (2013.01); *G01N 35/00584* (2013.01); *G06T 7/0004* (2013.01); *G06T 7/70* (2017.01); *G06T 2207/10028* (2013.01); *G06T 2207/30128* (2013.01)

(58) Field of Classification Search
CPC .............. G01N 35/0099; G01N 33/10; G01N 35/00584; G06T 7/70; G06T 7/0004; G06T 2207/10028; G06T 2207/30128
See application file for complete search history.

(56) References Cited

U.S. PATENT DOCUMENTS 9,457,970 B1 * 10/2016 Zevenbergen ......... B25J 9/0093
12,013,686 B1 * 6/2024 Parness .................. B25J 9/1615
(Continued)

FOREIGN PATENT DOCUMENTS

| CN | 106429483 A | 2/2017 |
| CN | 111766602 | * 10/2020 |

(Continued)

OTHER PUBLICATIONS

Mashine translation for CN212449703 (Year: 2021).*
(Continued)

*Primary Examiner* — Mohamad O El Sayah
(74) *Attorney, Agent, or Firm* — Fredrikson & Byron, P.A

(57) ABSTRACT

Processes for an autonomous grain facility are described herein. The process could include sampling and grading. For sampling, the system controls a robot to capture position data of a trailer and area data of grain, determines one or more sampling areas within the trailer, and controls the robot to obtain a sample from each of the sampling areas. For grading, the system measures data with both a near infrared sensor and a second sensor, analyzes all of the data to determine a dispositive action to be performed on the respective sample, and controls the system to perform the dispositive action.

16 Claims, 7 Drawing Sheets

(56) References Cited

U.S. PATENT DOCUMENTS

| | | | |
|---|---|---|---|
| 2007/0030349 A1* | 2/2007 | Riley | H04N 7/181 |
| | | | 348/143 |
| 2008/0167817 A1* | 7/2008 | Hessler | G01C 21/005 |
| | | | 701/514 |
| 2015/0347114 A1* | 12/2015 | Yoon | H04L 12/2832 |
| | | | 717/176 |
| 2018/0111769 A1* | 4/2018 | Yuvaraj | B25J 9/1687 |
| 2018/0147645 A1* | 5/2018 | Boccadoro | B23Q 17/2471 |
| 2018/0156697 A1 | 6/2018 | Fiechter | |
| 2019/0122425 A1* | 4/2019 | Sheffield | H04N 13/243 |
| 2019/0261566 A1* | 8/2019 | Robertson | G06T 7/50 |
| 2020/0025782 A1* | 1/2020 | Ahlfors | G01N 35/00 |
| 2020/0225673 A1* | 7/2020 | Ebrahimi Afrouzi | |
| | | | A47L 11/4011 |
| 2021/0302973 A1 | 9/2021 | King et al. | |
| 2022/0177222 A1* | 6/2022 | Ji | B66F 9/063 |
| 2023/0021155 A1* | 1/2023 | Fagerland | B25J 9/0093 |
| 2024/0159788 A1* | 5/2024 | Mussman | G01N 35/0099 |

FOREIGN PATENT DOCUMENTS

| | | |
|---|---|---|
| CN | 111766602 A | 10/2020 |
| CN | 212449703 U | 2/2021 |

OTHER PUBLICATIONS

Detecting empty and loaded platform semi-trailer using sidefire lidar (Year: 2021).*

Preparation of 3d models of trucks for timber load analysis (Year: 2019).*

International Search Report and Written Opinion in PCT/US2023/026054, Oct. 4, 2023, 14 pages.

* cited by examiner

AUTONOMOUS SYSTEM FOR GRAIN SAMPLING AND GRADING

RELATED APPLICATIONS

This application claims the benefit of U.S. Provisional Application No. 63/358,894, filed Jul. 7, 2022, the entire contents of which are incorporated herein by reference.

TECHNICAL FIELD

The disclosure relates to grain processing, and more particularly, a system for autonomously processing grain entering a facility.

BACKGROUND

Grain facilities currently require human operators throughout many points of the grain processing sequence. Current techniques require humans to handle various aspects of the grain sampling process, as well as to monitor and analyze data in the grading process. The human operators must also make decisions about how to handle the grain after the grading process. By requiring human operators to be present during the first stages of the grain processing sequence, facilities must either pay employees to be present and operate a facility every hour of every day, or farmers are limited to the times at which they can drop off their product. This can lead to either exorbitant costs incurred by the facility, or farmers lose valuable daylight hours that could be spent maintaining their crops to make deliveries. This also causes bottlenecks at the facilities, as all farmers must deliver their crops at a time the facility is running.

SUMMARY

In general, the disclosure includes an autonomous grain receiving and loadout facility that efficiently changes the methodology currently used in grain receiving, grading, storage, and loadout. The techniques described herein enable a grain receiving and loadout facility that can operate constantly without constant operator coverage. This facility would automatically interact with the truck driver, weigh the truck, sample the grain, grade the grain, determine which storage bin the grain should go to, initiate and run the required equipment to allow the truck driver to unload, monitor the unloading, weigh out the truck, and shut down the equipment. In addition, the sampling and grading system is being developed to include grading for more parameters than currently used in the open markets.

In one example, the disclosure is directed to a method for autonomously sampling grain. The method comprises receiving, by one or more processors, an indication that a trailer containing the grain is stationary within a sampling system, the sampling system comprising at least a robot with a light detection and ranging (LiDAR) sensor system. The method further comprises controlling, by the one or more processors, the robot to capture position data of the trailer and area data of the grain. The method also comprises determining, by the one or more processors, and based at least in part on the position data of the trailer and the area data of the grain, one or more sampling areas within the trailer for the grain. The method further comprises controlling, by the one or more processors, the robot to obtain a sample of the grain from one or more of the one or more sampling areas within the trailer.

In another example, the disclosure is directed to a method for autonomously grading grain samples. The method comprises controlling, by one or more processors, a grading system to automatically receive one or more grain samples from a sampling system. The method further comprises, for each of the one or more grain samples, controlling, by the one or more processors, a first sensor system to measure first data for the respective sample, wherein the first sensor system comprises a near infrared (NIR) sensor, controlling, by the one or more processors, a second sensor system to measure second data for the respective sample, wherein the second sensor system is different than the first sensor system, analyzing, by the one or more processors, the first data and the second data to determine a dispositive action to be performed on the respective sample, and controlling, by the one or more processors, the grading system to perform the dispositive action.

In another example, the disclosure is directed to a sampling system comprising a robot comprising a LiDAR sensor system. The system further comprises one or more processors configured to receive an indication that a trailer containing the grain is stationary within the sampling system, the sampling system comprising at least a robot with a light detection and ranging (LiDAR) sensor system. The one or more processors are further configured to control the robot to capture position data of the trailer and area data of the grain. The one or more processors are also configured to determine, based at least in part on the position data of the trailer and the area data of the grain, one or more sampling areas within the trailer for the grain. The one or more processors are further configured to control the robot to obtain a sample of the grain from one or more of the one or more sampling areas within the trailer.

In another example, the disclosure is directed to a non-transitory computer-readable storage medium containing instructions that, when executed, cause one or more processors to receive an indication that a trailer containing the grain is stationary within the sampling system, the sampling system comprising at least a robot with a light detection and ranging (LiDAR) sensor system. The instructions, when executed, further cause the one or more processors to control the robot to capture position data of the trailer and area data of the grain. The instructions, when executed, further cause the one or more processors to determine, and based at least in part on the position data of the trailer and the area data of the grain, one or more sampling areas within the trailer for the grain. The instructions, when executed, further cause the one or more processors to control the robot to obtain a sample of the grain from one or more of the one or more sampling areas within the trailer.

In another example, the disclosure is directed to an apparatus comprising means for performing any of the techniques described herein.

In another example, the disclosure is directed to a method comprising any of the techniques described herein.

another example, the disclosure is directed to any of the techniques described herein.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

The following drawings are illustrative of particular examples of the present disclosure and therefore do not limit the scope of the invention. The drawings are not necessarily to scale, though examples can include the scale illustrated, and are intended for use in conjunction with the explanations in the following detailed description wherein like reference characters denote like elements. Examples of the present disclosure will hereinafter be described in conjunction with the appended drawings.

DETAILED DESCRIPTION

The following detailed description is exemplary in nature and is not intended to limit the scope, applicability, or configuration of the techniques or systems described herein in any way. Rather, the following description provides some practical illustrations for implementing examples of the techniques or systems described herein. Those skilled in the art will recognize that many of the noted examples have a variety of suitable alternatives.

Figure 1:
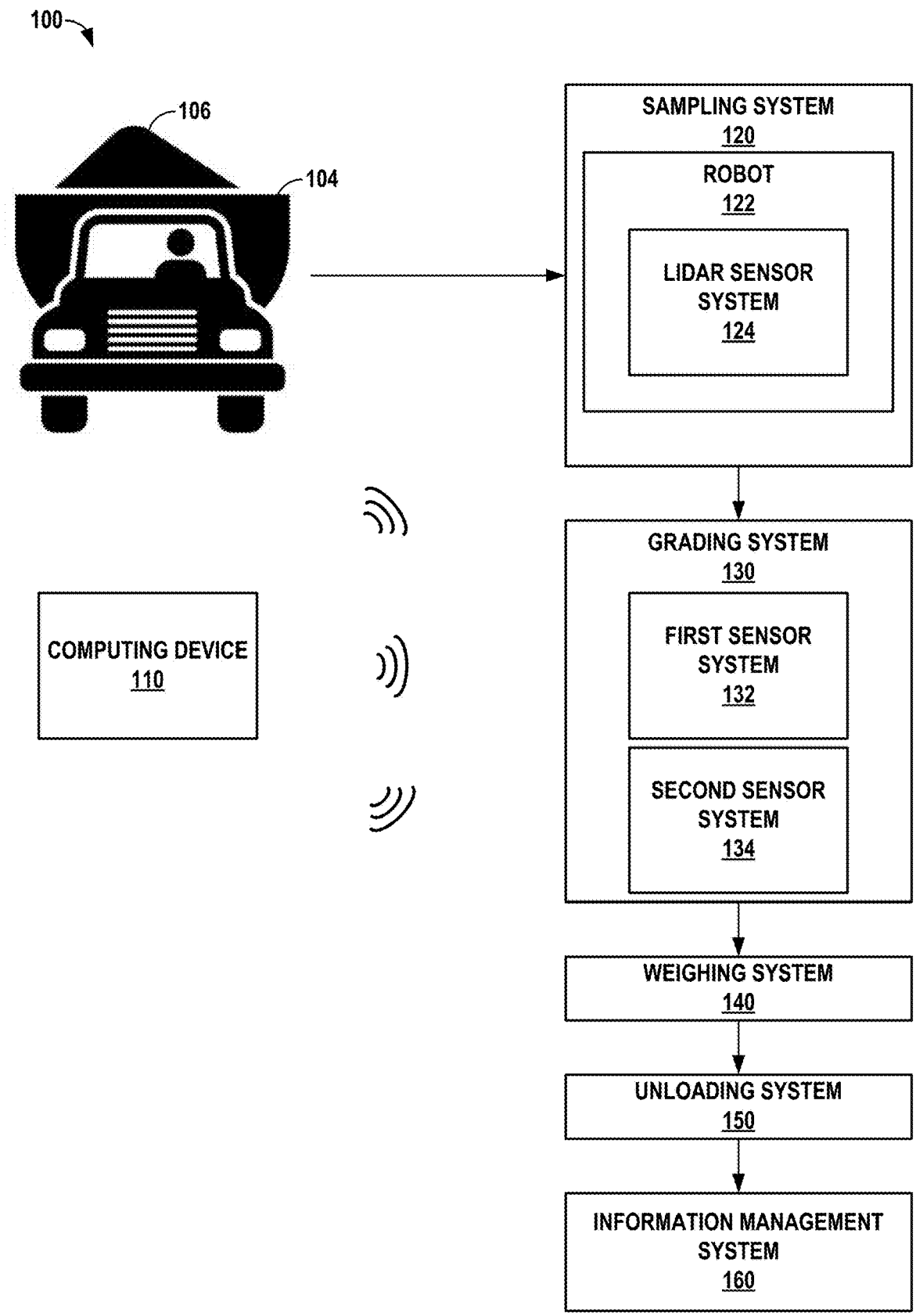
FIG. 1 is a conceptual block diagram illustrating an example autonomous grain processing facility, in accordance with the techniques described herein.

FIG. 1 is a block diagram illustrating various components of autonomous grain processing facility 100. In the example of FIG. 1, truck 104 carries grain 106 into autonomous grain processing facility 100. Truck 104 may be any truck with a cargo compartment that is at least partially open on a top portion of the cargo compartment such that the cargo compartment can carry grain 106 and that grain 106 can be evaluated by robot 122 above grain 106. Grain 106 may be any agricultural plant product that can be sampled or evaluated, including wheat, corn, soybeans, hops, rice, oats, cornmeal, barley, *cannabis*, or any other crop that could be sampled and evaluated using the techniques described herein.

Truck 104 may enter autonomous grain processing facility 100 with grain 106 and park within the bounds of sampling system 120. Robot 122 of sampling system 120, using Light Detection and Ranging (LiDAR) sensor system 124, can detect the presence of truck 104 and perform the sampling process, under the control of computing device 110, on grain 106. Robot 122 may be any one or more of a gantry crane style robot or a robotic arm attached to a monorail, wherein robot 122 is moveable in three-dimensional space.

Computing device 110 may be any computer with the processing power required to adequately execute the techniques described herein. For instance, computing device 110 may be any one or more of a mobile computing device (e.g., a smartphone, a tablet computer, a laptop computer, etc.), a desktop computer, a smarthome component (e.g., a computerized appliance, a home security system, a control panel for home components, a lighting system, a smart power outlet, etc.), a wearable computing device (e.g., a smart watch, computerized glasses, a heart monitor, a glucose monitor, smart headphones, etc.), a virtual reality/augmented reality/extended reality (VR/AR/XR) system, a video game or streaming system, a network modem, router, or server system, or any other computerized device that may be configured to perform the techniques described herein.

Once grain 106 is sampled, the samples are automatically transported (e.g., via self-driving vehicle, conveyor belt, or any other automatic and autonomous transport mechanism) to grading system 130. Grading system 130 includes first sensor system 132, such as a near infrared (NIR) sensor, and a second sensor system, such as a flow-through sensor and/or a camera system. Under control of computing device 110, grading system 130 may autonomously perform the grading process described herein. After being graded, the grain samples may be transported to the remaining autonomous processing stations, including weighing system 140, unloading system 150, and information management system 160.

Sampling system 120 includes of robot 122 with an attached probe, that includes LiDAR sensor system 124, that collects a sample from truck 104 or a wagon delivering grain 106. Current technology uses a probe attached to a manual robot that is controlled by an operator using a joystick. The operator, using the joystick, positions the probe over the truck or wagon using a video camera system or direct visual contact with the wagon to position the probe and insert the probe into the grain to collect a sample. There are various designs of sample probes.

The system described herein would eliminate the operator. In order to do this, sampling system 120 may autonomously perform the operator's functions. The primary function of the operator, to detect the location of the grain trailer and automatically move the sampling probe into the areas of the truck or trailer where grain is present and sample it, is autonomously possible with the techniques described herein.

To accommodate the automation of positioning the sample probe, instead of a stationary robot that samples from within its radial reach, robot 122 may be a gantry crane style robot or a robotic arm on a monorail that can utilize XYZ coordinate control. This is also as opposed to other robots that cannot identify, on its own, the sample of the areas of the grain in the trailer, but instead rely on pre-programmed locations to sample.

Sampling system 120 will automatically detect the position of the trailer under the structure of robot 122 and position robot 122 accordingly. The techniques described herein utilize LiDAR sensor system 124 technology to locate the position of the trailer and determine the areas that can be sampled. LiDAR sensor system 124 may be mounted on robot 122 and, once truck 104 and trailer is positioned under robot 122, computing device 110 will initiate a scan of truck 104 and trailer. Robot 122 is moved down the length of truck 104 and trailer creating the scan. That scan is fed through computing device 110 that then determines the dimensions of the trailer and locates any obstructions within that trailer such as support bows for the canvas top of the trailer. The areas that are not sampleable are taken out of the areas that are sampleable and the remaining areas are then identified and the number of samples based upon that area are determined. Robot 122 is then transitioned across the trailer taking those samples on its way back to its original home position. The sample is then automatically transported to grading system 130.

Grading systems have evolved over the years. Historically, grading was done mainly by hand with limited automation involved. The automation that did exist was mainly in the areas of determining moisture content and test weight (density).

Grading system 130 may utilize first sensor system 132, which may be a flow-through NIR (Near InfraRed) analyzer, to determine such parameters as moisture content, protein content, and several other parameters not currently being used in marketing grain. Second sensor system 134, including one or more of a separate flow through sensor and a camera system, may determine test weight and damage. Test weight is accomplished using common volume-weight measurements but damage may be determined using vision systems. After testing the sample, the sample can either be bagged for future reference, or returned to the grain trailer.

Weighing system 140 may utilize bulk weighing technology for truck/trailer transport. Current technology requires weighing the truck twice. Once full, as it is coming in, and again after it has been unloaded to determine the amount of grain delivered. Bulk weighing is the process of weighing the grain as it is moving through the transport equipment. By using bulk weighing, weighing system 140 eliminates the truck visiting the scales all together. The benefit to this is speeding up the delivery and unloading time at the critical time of harvest.

Figure 2:
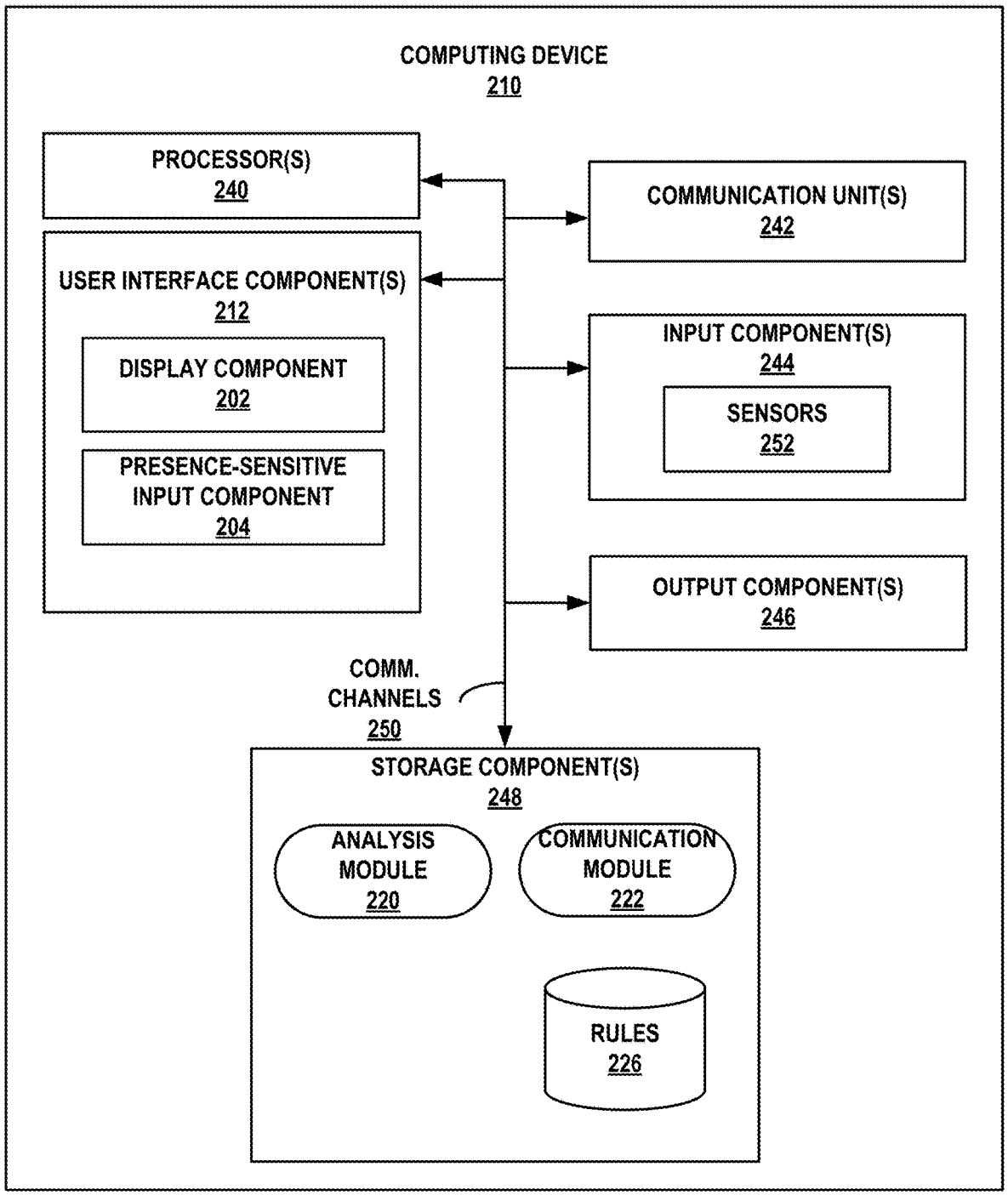
FIG. 2 is a block diagram illustrating a more detailed example of a computing device configured to perform the techniques described herein.

FIG. 2 is a block diagram illustrating a more detailed example of a computing device configured to perform the techniques described herein. Computing device 210 of FIG. 2 is described below as an example of computing device 110 of FIG. 1. FIG. 2 illustrates only one particular example of computing device 210, and many other examples of computing device 210 may be used in other instances and may include a subset of the components included in example computing device 210 or may include additional components not shown in FIG. 2.

Computing device 210 may be any computer with the processing power required to adequately execute the techniques described herein. For instance, computing device 210 may be any one or more of a mobile computing device (e.g., a smartphone, a tablet computer, a laptop computer, etc.), a desktop computer, a smarthome component (e.g., a computerized appliance, a home security system, a control panel for home components, a lighting system, a smart power outlet, etc.), a wearable computing device (e.g., a smart watch, computerized glasses, a heart monitor, a glucose monitor, smart headphones, etc.), a virtual reality/augmented reality/extended reality (VR/AR/XR) system, a video game or streaming system, a network modem, router, or server system, or any other computerized device that may be configured to perform the techniques described herein.

As shown in the example of FIG. 2, computing device 210 includes user interface components (UIC) 212, one or more processors 240, one or more communication units 242, one or more input components 244, one or more output components 246, and one or more storage components 248. UIC 212 includes display component 202 and presence-sensitive input component 204. Storage components 248 of computing device 210 include analysis module 220, communication module 222, and rules data store 226.

One or more processors 240 may implement functionality and/or execute instructions associated with computing device 210 to autonomously sample and grade various grain products. That is, processors 240 may implement functionality and/or execute instructions associated with computing device 210 to control industrial equipment to sample and grade grain shipments.

Examples of processors 240 include application processors, display controllers, auxiliary processors, one or more sensor hubs, and any other hardware configured to function as a processor, a processing unit, or a processing device. Modules 220 and 222 may be operable by processors 240 to perform various actions, operations, or functions of computing device 210. For example, processors 240 of computing device 210 may retrieve and execute instructions stored by storage components 248 that cause processors 240 to perform the operations described with respect to modules 220 and 222. The instructions, when executed by processors 240, may cause computing device 210 to control industrial equipment to analyze and gather samples autonomously and autonomously grade those gathered samples.

Analysis module 220 may execute locally (e.g., at processors 240) to provide functions associated with analyzing data to determine sampling areas and grades for those gathered samples. In some examples, analysis module 220 may act as an interface to a remote service accessible to computing device 210. For example, analysis module 220 may be an interface or application programming interface (API) to a remote server that analyzes data to determine sampling areas and grades for those gathered samples/

In some examples, communication module 222 may execute locally (e.g., at processors 240) to provide functions associated with communicating with various industrial equipment to control that equipment and gather data from that equipment. In some examples, communication module 222 may act as an interface to a remote service accessible to computing device 210. For example, communication module 222 may be an interface or application programming interface (API) to a remote server that controls industrial equipment to capture data about grain and grain samples.

One or more storage components 248 within computing device 210 may store information for processing during operation of computing device 210 (e.g., computing device 210 may store data accessed by modules 220 and 222 during execution at computing device 210). In some examples, storage component 248 is a temporary memory, meaning that a primary purpose of storage component 248 is not long-term storage. Storage components 248 on computing device 210 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 248, in some examples, also include one or more computer-readable storage media. Storage components 248 in some examples include one or more non-transitory computer-readable storage mediums. Storage components 248 may be configured to store larger amounts of information than typically stored by volatile memory. Storage components 248 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 248 may store program instructions and/or information (e.g., data) associated with modules 220 and 222 and data store 226. Storage components 248 may include a memory configured to store data or other information associated with modules 220 and 222 and data store 226.

Communication channels 250 may interconnect each of the components 212, 240, 242, 244, 246, and 248 for inter-component communications (physically, communicatively, and/or operatively). In some examples, communication channels 250 may include a system bus, a network connection, an inter-process communication data structure, or any other method for communicating data.

One or more communication units 242 of computing device 210 may communicate with external devices via one or more wired and/or wireless networks by transmitting and/or receiving network signals on one or more networks. Examples of communication units 242 include a network interface card (e.g., such as an Ethernet card), an optical transceiver, a radio frequency transceiver, a GPS receiver, a radio-frequency identification (RFID) transceiver, a near-field communication (NFC) transceiver, or any other type of device that can send and/or receive information. Other examples of communication units 242 may include short wave radios, cellular data radios, wireless network radios, as well as universal serial bus (USB) controllers.

One or more input components 244 of computing device 210 may receive input. Examples of input are tactile, audio, and video input. Input components 244 of computing device 210, in one example, include a presence-sensitive input device (e.g., a touch sensitive screen, a PSD), mouse, keyboard, voice responsive system, camera, microphone or any other type of device for detecting input from a human or machine. In some examples, input components 244 may include one or more sensor components (e.g., sensors 252). Sensors 252 may include one or more biometric sensors (e.g., fingerprint sensors, retina scanners, vocal input sensors/microphones, facial recognition sensors, cameras), one or more location sensors (e.g., GPS components, Wi-Fi components, cellular components), one or more temperature sensors, one or more movement sensors (e.g., accelerometers, gyros), one or more pressure sensors (e.g., barometer), one or more ambient light sensors, and one or more other sensors (e.g., infrared proximity sensor, hygrometer sensor, and the like). Other sensors, to name a few other non-limiting examples, may include a heart rate sensor, magnetometer, glucose sensor, olfactory sensor, compass sensor, or a step counter sensor.

One or more output components 246 of computing device 210 may generate output in a selected modality. Examples of modalities may include a tactile notification, audible notification, visual notification, machine generated voice notification, or other modalities. Output components 246 of computing device 210, in one example, include a presence-sensitive display, a sound card, a video graphics adapter card, a speaker, a cathode ray tube (CRT) monitor, a liquid crystal display (LCD), a light emitting diode (LED) display, an organic LED (OLED) display, a virtual/augmented/extended reality (VR/AR/XR) system, a three-dimensional display, or any other type of device for generating output to a human or machine in a selected modality.

UIC 212 of computing device 210 may include display component 202 and presence-sensitive input component 204. Display component 202 may be a screen, such as any of the displays or systems described with respect to output components 246, at which information (e.g., a visual indication) is displayed by UIC 212 while presence-sensitive input component 204 may detect an object at and/or near display component 202.

While illustrated as an internal component of computing device 210, UIC 212 may also represent an external component that shares a data path with computing device 210 for transmitting and/or receiving input and output. For instance, in one example, UIC 212 represents a built-in component of computing device 210 located within and physically connected to the external packaging of computing device 210 (e.g., a screen on a mobile phone). In another example, UIC 212 represents an external component of computing device 210 located outside and physically separated from the packaging or housing of computing device 210 (e.g., a monitor, a projector, etc. that shares a wired and/or wireless data path with computing device 210).

UIC 212 of computing device 210 may detect two-dimensional and/or three-dimensional gestures as input from a user of computing device 210. For instance, a sensor of UIC 212 may detect a user's movement (e.g., moving a hand, an arm, a pen, a stylus, a tactile object, etc.) within a threshold distance of the sensor of UIC 212. UIC 212 may determine a two or three-dimensional vector representation of the movement and correlate the vector representation to a gesture input (e.g., a hand-wave, a pinch, a clap, a pen stroke, etc.) that has multiple dimensions. In other words, UIC 212 can detect a multi-dimension gesture without requiring the user to gesture at or near a screen or surface at which UIC 212 outputs information for display. Instead, UIC 212 can detect a multi-dimensional gesture performed at or near a sensor which may or may not be located near the screen or surface at which UIC 212 outputs information for display.

In accordance with one or more techniques of this disclosure, communication module 222 may receive an indication that a trailer containing the grain is stationary within a sampling system. The sampling system may include at least a robot with a light detection and ranging (LiDAR) sensor system. In some examples, the robot may be one or more of a gantry crane style robot or a robotic arm attached to a monorail, with the robot being moveable in three-dimensional space.

Communication module 222 may control the robot to capture position data of the trailer and area data of the grain. In some examples, in capturing the position data of the trailer and the area data of the grain, communication module 222, in response to receiving the indication that the trailer containing the grain is stationary within the sampling system, may initiate a scan of the trailer. Communication module 222 may control the robot to traverse the length of the trailer during the scan to create a three-dimensional LiDAR model of the trailer. Analysis module 220 may analyze the three-dimensional LiDAR model of the trailer to determine the position data of the trailer and the area data of the grain. The position data of the trailer may include one or more of a location of the trailer within the sampling system, coordinates of one or more edges of the trailer, coordinates of one or more obstructions within the trailer, and dimensions of the trailer.

In analyzing the three-dimensional LiDAR model of the trailer, analysis module 220 may identify one or more obstructions within the trailer. Analysis module 220 may indicate the one or more obstructions in the area data of the grain. Analysis module 220 may then determine the one or more sampling areas from the area data of the grain such that the one or more obstructions are not included in the one or more sampling areas.

In some examples, in indicating the one or more obstructions in the area data of the grain, analysis module 220 may remove, for each of the one or more obstructions, an area corresponding to the respective obstruction from the area data of the grain. In other examples, in indicating the one or more obstructions in the area data of the grain, analysis module 220 may mark, for each of the one or more obstructions, an area corresponding to the respective obstruction as unsampleable in the area data of the grain.

In some examples, in controlling the robot to traverse the length of the trailer during the scan, communication module 222 may control the robot to travel a single pass from a first end of the trailer to a second end of the trailer opposite the first end.

Analysis module 220 may determine, based at least in part on the position data of the trailer and the area data of the grain, one or more sampling areas within the trailer for the grain. Communication module 222 may then control the robot to obtain a sample of the grain from one or more of the one or more sampling areas within the trailer. In some instances, the samples are gathered from each sampling area. In other instances, the samples are gathered from a random assortment of the sampling areas. In some examples, in controlling the robot to obtain a sample of the grain from the one or more of the one or more sampling areas within the trailer, communication module 222 may control the robot to obtain the sample of the grain from the one or more of the one or more sampling areas as the robot moves in a single pass back towards the first end of the trailer from the second end of the trailer.

In some examples, after obtaining the samples, communication module 222 may control the sampling system to automatically transport the samples to a grading system, such as via a self-driving vehicle or an automatic conveyor belt, among other things.

In accordance with additional techniques of this disclosure for autonomously grading grain samples, communication module 222 may control a grading system to automatically receive one or more grain samples from a sampling system.

For each of the one or more grain samples, communication module 222 may control a first sensor system, such as an NIR sensor, to measure first data for the respective sample. The first data may be one or more of moisture content and protein content.

Communication module 222 may control a second sensor system to measure second data for the respective sample, where the second sensor system is different than the first sensor system. For instance, the second sensor system may be any one or more flow through sensors and one or more cameras. In some examples, the second data may be any one or more of weight data and damage data.

For example in wherein measuring the weight data, communication module 222 may control the one or more flow through sensors to capture a volume-weight measurement for the respective sample. Analysis module 220 may then derive the weight data for the respective sample from the volume-weight measurement for the respective sample.

In other examples, the damage data may include a damage grade. In such examples, in measuring the damage data, communication module 222 may control the one or more cameras to capture image data for the respective sample. Analysis module 220 may then perform image analysis on the image data to determine the damage grade for the respective sample.

Analysis module 220 may further analyze the first data and the second data to determine a dispositive action to be performed on the respective sample. For instance, the dispositive action may be any one or more of automatically bagging the respective sample or returning the respective sample to a grain trailer.

In some examples, in determining the dispositive action, analysis module 220 may determine the dispositive action based at least in part on the first data, the weight data, and the damage data. In some instance, in determining the dispositive action, analysis module 220 may determine, based at least in part on the first data and the second data, a sample grade for the respective sample. Analysis module 220 may compare the sample grade to a threshold grade. Analysis module 220 may determine the dispositive action based on whether the sample grade meets the threshold grade.

Communication module 222 may control the grading system to perform the dispositive action. For instance, when the dispositive action includes returning the respective sample to a grain trailer, communication module 222 may control the grading system to move the grain trailer to a weighing system.

Figure 3:
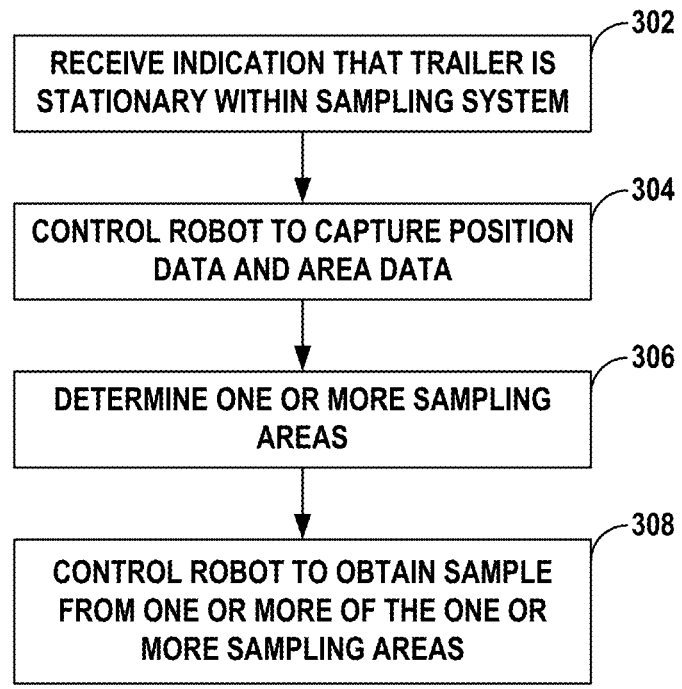
FIG. 3 is a flow diagram illustrating an autonomous grain sampling process, in accordance with the techniques described herein.

FIG. 3 is a flow diagram illustrating an autonomous grain sampling process, in accordance with the techniques described herein. The techniques of FIG. 3 may be performed by one or more processors of a computing device, such as system 100 of FIG. 1 and/or computing device 210 illustrated in FIG. 2. For purposes of illustration only, the techniques of FIG. 3 are described within the context of computing device 210 of FIG. 2, although computing devices having configurations different than that of computing device 210 may perform the techniques of FIG. 3.

In accordance with the techniques described herein, communication module 222 receives an indication that a trailer containing the grain is stationary within a sampling system (302). The sampling system includes at least a robot with a light detection and ranging (LiDAR) sensor system. Communication module 222 controls the robot to capture position data of the trailer and area data of the grain (304). Analysis module 220 determines, based at least in part on the position data of the trailer and the area data of the grain, one or more sampling areas within the trailer for the grain (306). Communication module 222 controls the robot to obtain a sample of the grain from one or more of the one or more sampling areas within the trailer (308).

Figure 4:
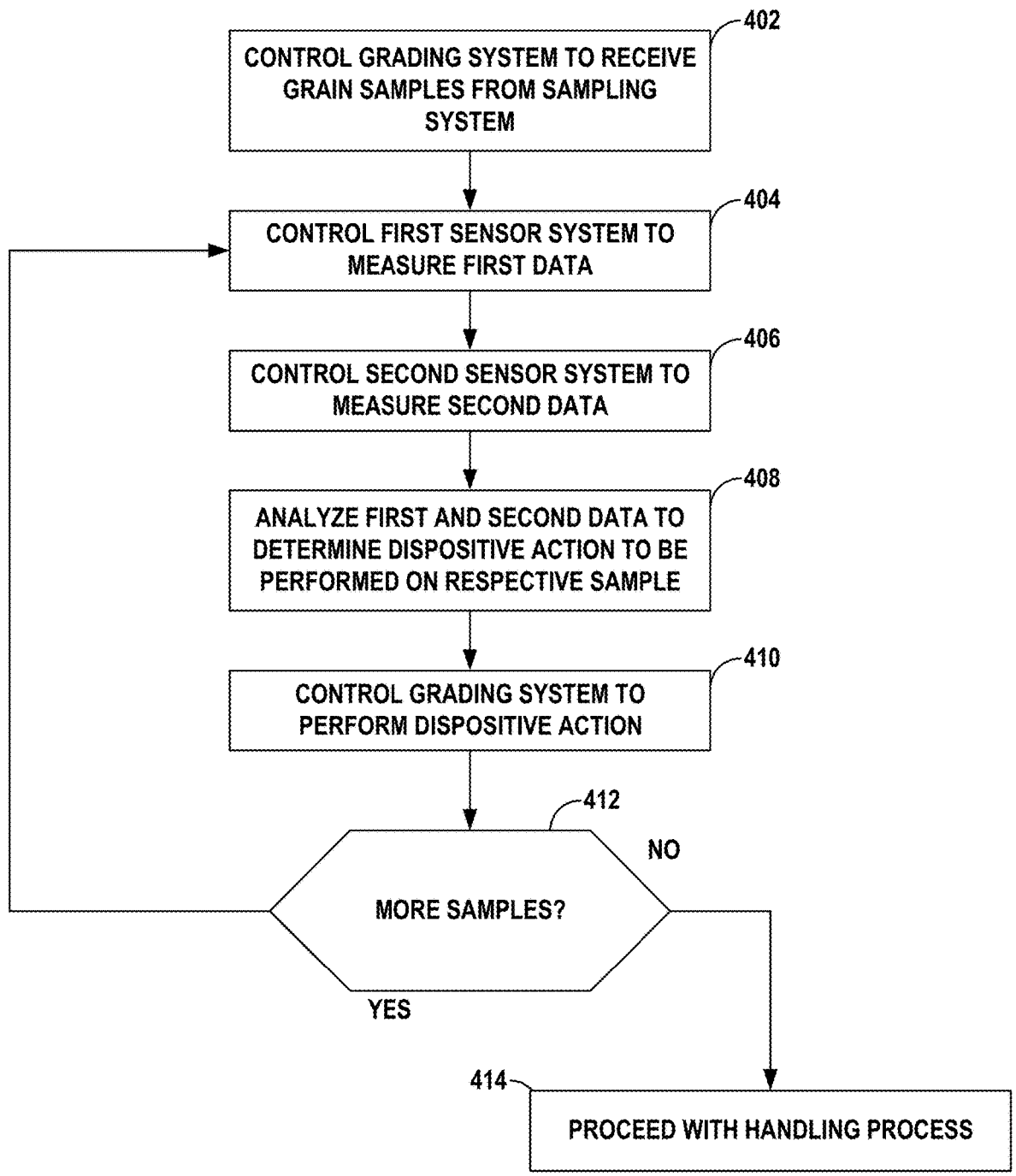
FIG. 4 is a flow diagram illustrating an autonomous grain grading process, in accordance with the techniques described herein.

FIG. 4 is a flow diagram illustrating an autonomous grain grading process, in accordance with the techniques described herein. The techniques of FIG. 4 may be performed by one or more processors of a computing device, such as system 100 of FIG. 1 and/or computing device 210 illustrated in FIG. 2. For purposes of illustration only, the techniques of FIG. 4 are described within the context of computing device 210 of FIG. 2, although computing devices having configurations different than that of computing device 210 may perform the techniques of FIG. 4.

In accordance with the techniques described herein, communication module 222 controls a grading system to automatically receive one or more grain samples from a sampling system (402). For each of the one or more grain samples, communication module 222 controls a first sensor system to measure first data for the respective sample (404). The first sensor system includes a near infrared (NIR) sensor. Communication module 222 controls a second sensor system to measure second data for the respective sample (406), the second sensor system being different than the first sensor system. Analysis module 220 analyzes the first data and the second data to determine a dispositive action to be performed on the respective sample (408). Communication module 222 controls the grading system to perform the dispositive action (410). The system then determines whether more samples are left to be graded (412). If there are more samples to be graded ("YES" branch of 412), the system proceeds to step 404 to repeat the grading process on the next sample. If there are no more samples to be graded ("NO" branch of 412), the system proceeds with the handling process (414).

Figure 5:
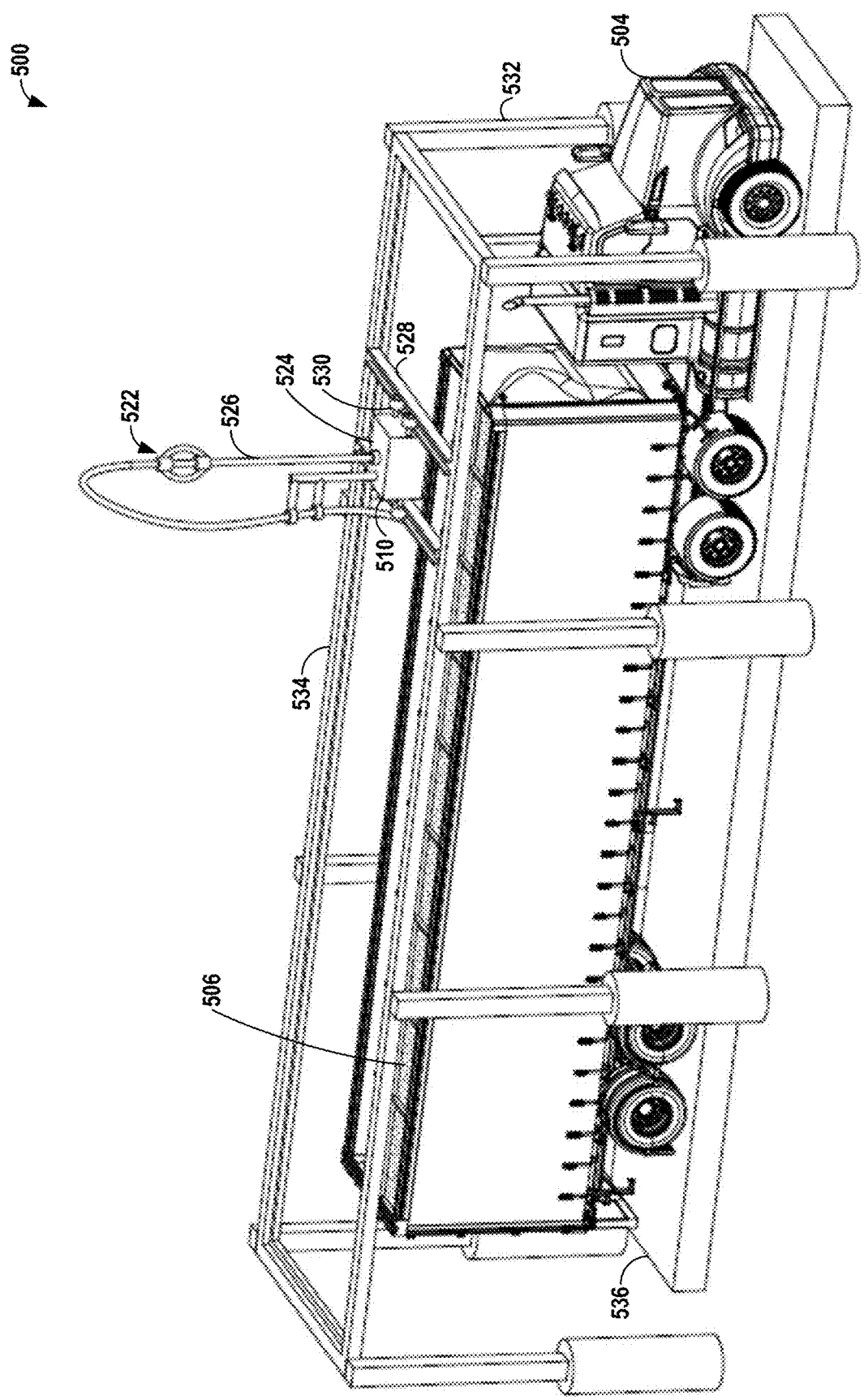
FIG. 5 is a conceptual diagram illustrating an example autonomous grain sampling system, in accordance with the techniques described herein.

FIG. 5 is a conceptual diagram illustrating an example autonomous grain sampling system 500, in accordance with the techniques described herein. In the example of FIG. 5, autonomous grain sampling system 500 is shown with truck 504 delivering grain payload 506 to autonomous grain sampling system 500. Truck 504 may be any truck with a cargo compartment that is at least partially open on a top portion of the cargo compartment such that the cargo compartment can carry grain payload 506 and that grain payload 506 can be evaluated by robot 522 above grain payload 506. Grain payload 506 may be any agricultural plant product that can be sampled or evaluated, including wheat, corn, soybeans, hops, rice, oats, cornmeal, barley, *cannabis*, or any other crop that could be sampled and evaluated using the techniques described herein. Truck 504 is parked on platform 536 underneath robot 522.

In the example of FIG. 5, robot 522 includes computing device 510, LiDAR sensor 524, and sampling probe 526. Computing device 510 may be similar to any of computing devices 110 and 210 described above, and may be any computer with the processing power required to adequately execute the techniques described herein. For instance, computing device 510 may be any one or more of a mobile computing device (e.g., a smartphone, a tablet computer, a laptop computer, etc.), a desktop computer, a smarthome component (e.g., a computerized appliance, a home security system, a control panel for home components, a lighting system, a smart power outlet, etc.), a wearable computing device (e.g., a smart watch, computerized glasses, a heart monitor, a glucose monitor, smart headphones, etc.), a virtual reality/augmented reality/extended reality (VR/AR/XR) system, a video game or streaming system, a network modem, router, or server system, or any other computerized device that may be configured to perform the techniques described herein. In the example of FIG. 5, computing device 510 is incorporated into robot 522. In other examples, computing device 510 may be a remote computing device in communication with and controlling robot 522 remotely.

LiDAR sensor 524 may be incorporated into a bottom portion of robot 522, directed downwards towards truck 504 and grain payload 506. LiDAR sensor 524 may be any sensor capable of emitting light to generate LiDAR images, such as LiDAR image 740 of FIG. 7.

In the example of FIG. 5, sampling probe 526 is a long probe extending through robot 522, but in other examples may be configured in other directions, shapes, or mechanisms. In general, sampling probe 526 may be any device capable of extending into grain payload 506 and retrieving a sample of the grain payload 506 in the particular sampling area.

Robot 522 may sit atop cross rail 528 via rollers 530. To traverse truck 504 from side-to-side, computing device 510 may control robot 522 to move along cross rail 528 using rollers 530 such that LiDAR sensor 524 and sampling probe 526 have access to every horizontal location along gantry structure 532.

Cross rails 528 and robot 522 may also be capable of traversing gantry structure 532 lengthwise along gantry rail 534. In other words, in addition to traversing the width of gantry structure 532 via cross rail 528, computing device 510 may also control robot 522 to traverse over the length of truck 504 via gantry structure 532 and gantry rail 534. Computing device 510 and robot 522 may utilize rollers, similar to rollers 530, to traverse gantry rail 534. In other instances, any of the rollers may be replaced with other movement mechanisms, such as belts, hydraulics, or any other movement mechanism.

While the instance of FIG. 5 shows robot 522 as a moveable robot, in other instances, robot 522 may be stationary. In such instances, robot 522 may include LiDAR sensor 524 that is of such a large size that LiDAR sensor 524 does not need to move along gantry structure 532 to capture the scan of truck 504 (e.g., LiDAR sensor 524 may be capable of producing thousands of beams of light to capture the data). Gantry structure 532 may be taller in such instances, or may be capable of moving robot 522 upwards to a height of being able to capture the proper scan without moving lengthwise or widthwise along gantry structure 532. In still other instances, gantry structure 532 may include multiple instances of robot 522, each instance being either movable along a smaller area or stationary. Computing device 510 may receive scans from each of the multiple instances of robot 522 and may assemble the multiple scans into a single LiDAR model based on predefined areas that each of the multiple robots 522 cover.

Figure 6:
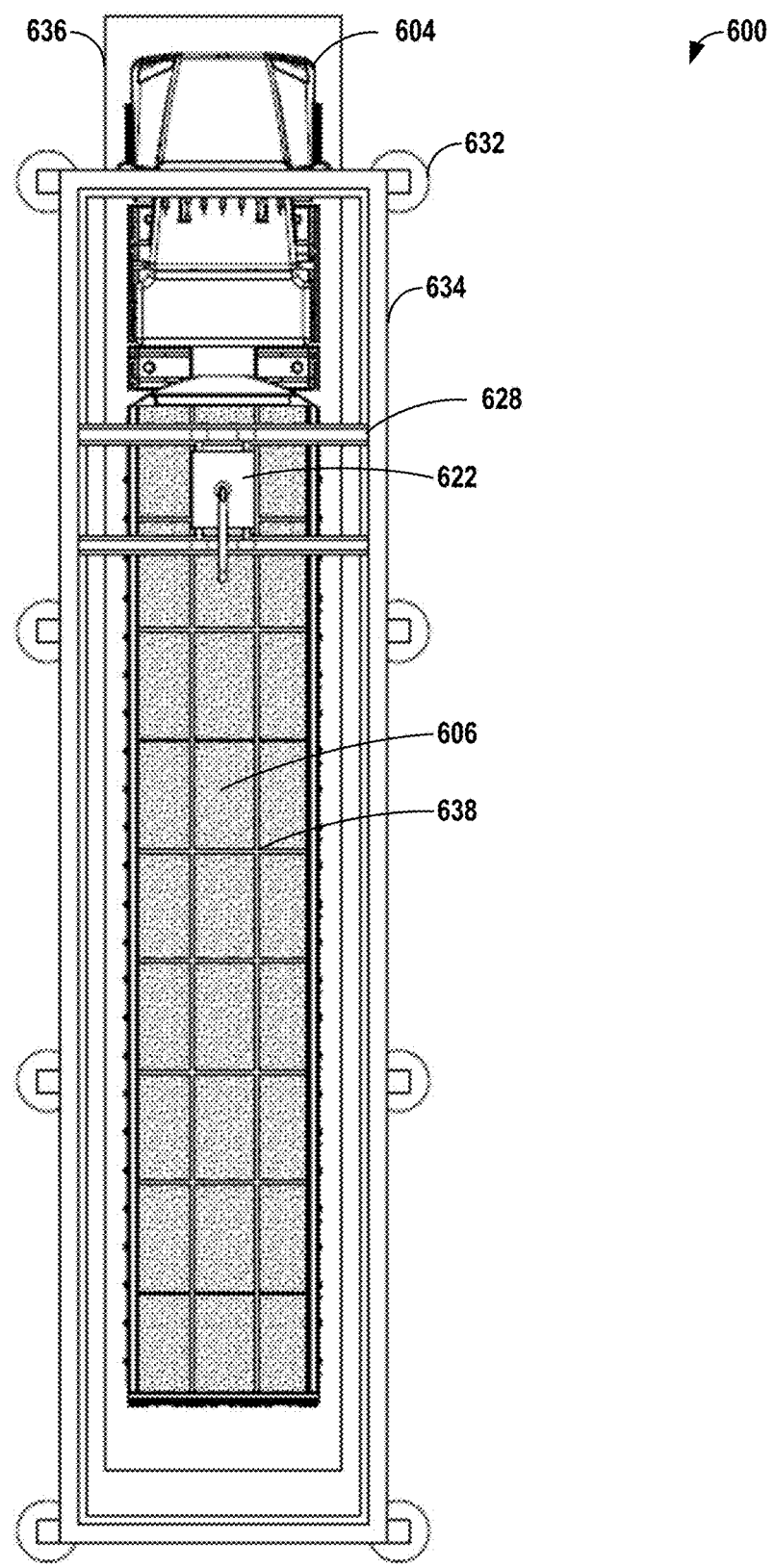
FIG. 6 is a top-down view of a conceptual diagram illustrating an example autonomous grain sampling system, in accordance with the techniques described herein.

FIG. 6 is a top-down view of a conceptual diagram illustrating an example autonomous grain sampling system 600, in accordance with the techniques described herein. Autonomous grain sampling system 600 may include similar components as autonomous grain sampling system 500, but may also include additional or fewer components. Additionally, any component listed in FIG. 6 for autonomous grain sampling system 600 may be similar to the counterpart of that component described above in FIG. 5.

In the example of FIG. 6, truck 604 is parked on platform 636 while carrying grain payload 606. Robot 622, which may include a computing device (similar to computing device 510), a LiDAR sensor (similar to LiDAR sensor 524), and a sampling probe (similar to sampling probe 526) is configured atop gantry structure 632. Robot 522 may traverse the width of gantry structure 632 using cross rail 628, and may traverse the length of gantry structure by moving along gantry rail 634.

As shown in the top-down view, truck 604 also includes obstruction 638. In the example of FIG. 6, obstruction 638 may be a strap system configured to hold down grain payload 606 during transport. In other instances, obstruction 638 may be an internal support structure for truck 604, a hard pressure system to hold down grain payload 606, or a cloth cover for grain payload 606. In general, obstruction 638 may be any object that is between grain payload 606 and robot 622 and that is not fit to be sampled by robot 622.

Previously, a manual user may grab samples from grain payload 622. In some automated instances, pre-set coordinates are input into the system for robot 622 to travel to and grab samples from those pre-set coordinates. This creates a number of issues. If truck drivers learn of these pre-set coordinates, they may arrange grain payload 606 such that the highest quality grain is always in that location, thereby artificially improving the ultimate grade received by grain payload 606. Additionally, trucks may come in having different sizes, or different configurations of obstruction 638. If the truck is situated such that an obstruction, the cab of the truck, or an edge of the truck is at the pre-set coordinate, either the sampling probe of robot 622 or the truck itself could be damaged. This damage could further contaminate the grain of hard plastic or metal pieces break off into grain payload 606.

In accordance with the techniques described herein, robot 622 may use a LiDAR sensor system to scan truck 604. This could be initiated by robot 622 using the LiDAR sensor system (or some other motion detection sensors) to detect the new presence of a truck within gantry structure 632. In other instances, platform 636 may include a weight sensor, which communicates with the computing device when a certain weight is exceeded to start the process.

Figure 7:
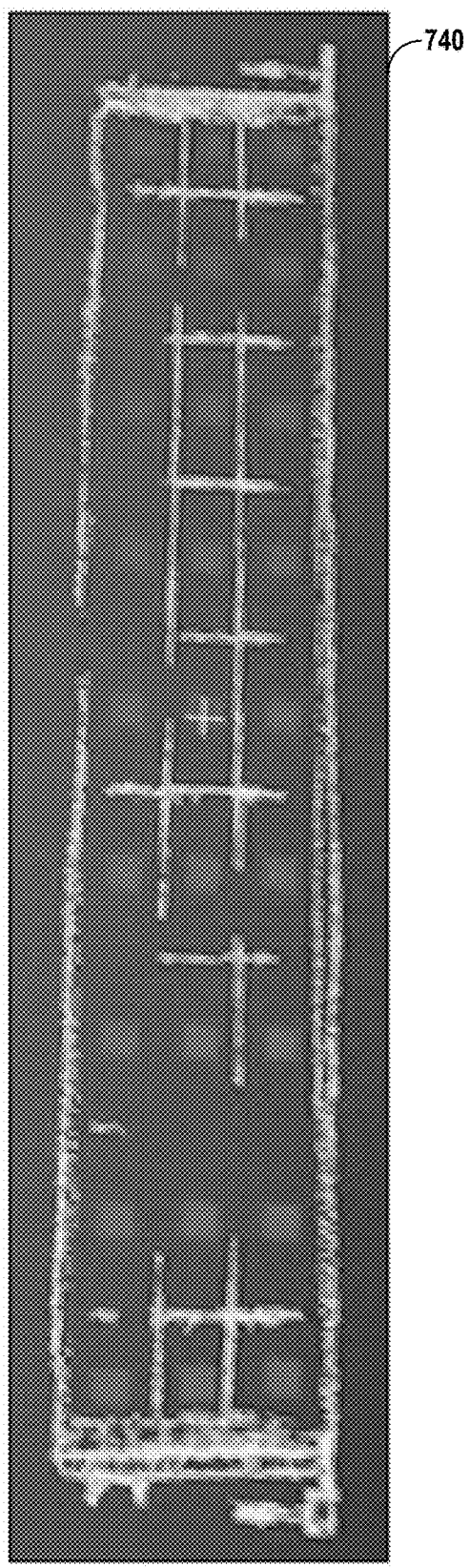
FIG. 7 is an example LiDAR scan of a payload of a truck inside the autonomous grain sampling system, in accordance with the techniques described herein.

In any instance, once robot 622 initiates the process, robot 622 may traverse truck 604 along gantry structure 632 to produce a LiDAR scan of grain payload 606 and obstruction 638. FIG. 7 is an example LiDAR scan 740 of grain payload 606 of truck 604 inside autonomous grain sampling system 600, in accordance with the techniques described herein. Robot 622 may traverse gantry structure 632 in any suitable pattern, such as going back and forth horizontally along cross rail 628 while slowly or step-wise traversing gantry rail 634, or by going back and forth along gantry rail 634 while slowly or step-wise traversing cross rail 628. When scanned using LiDAR, grain payload 606 will produce a different signature than obstruction 638.

As shown in example LiDAR scan 740, obstruction 638, along with the edges of truck 604, reflect more light than grain payload 606. As such, the same areas corresponding to obstruction 638 and truck 604 produce bright signatures in LiDAR scan 740. Conversely, grain payload 606 will not reflect as much of the light, producing dimmer signatures in LiDAR scan 740.

The computing device may determine the locations of the boundaries of truck 604 and the locations of obstruction 638 by utilizing known translations of coordinates within LiDAR scan 740 based on the known location and known limits of gantry structure 632 and where robot 622 can travel. In other words, given the consistent height and range of robot 622 and the LiDAR sensor, coordinates within the produced LiDAR scans will directly correspond to known physical locations or coordinates for robot 622 within gantry structure 632.

By analyzing LiDAR scan 740, robot 622 and the computing device can predict that there are 27 distinct sampling areas that include grain, as separated by the edges of truck 604 and a grid created by obstruction 638. Utilizing the coordinates of the signatures created by truck 604 and obstruction 638, robot 622 can determine to avoid those coordinates when taking samples. Rather, robot 622 can retrieve samples from one or more of the 27 distinct sampling areas present in the LiDAR scan. In some instances, robot 622 may retrieve a sample from each of the 27 distinct sampling areas. In other instances, robot 622 may retrieve a sample from a random assortment of the 27 distinct sampling areas, thereby minimizing the number of samples taken while still maintaining the unpredictability that restricts drivers from placing the best samples in particular locations.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples of the disclosure have been described. Any combination of the described systems, operations, or functions is contemplated. These and other examples are within the scope of the following claims.

What is claimed is:

1. A method for autonomously sampling grain, the method comprising:
receiving, by one or more processors, an indication that a trailer containing the grain is stationary within a sampling system, the sampling system comprising at least a robot with a light detection and ranging (LiDAR) sensor system;
controlling, by the one or more processors, the robot to capture position data of the trailer and area data of the grain, wherein capturing the position data of the trailer and the area data of the grain comprises, in response to receiving the indication that the trailer containing the grain is within the sampling system:
initiating, by the one or more processors, a LiDAR scan of the trailer using the robot;
controlling, by the one or more processors, the robot to traverse the length of the trailer during the LiDAR scan to create the three-dimensional LiDAR model of the trailer, wherein controlling the robot to traverse the length of the trailer during the scan comprises controlling, by the one or more processors, the robot to travel a single pass from a first end of the trailer to a second end of the trailer opposite the first end; and
analyzing, by the one or more processors, the three-dimensional LiDAR model of the trailer to determine the position data of the trailer and the area data of the grain;
determining, by the one or more processors, and based at least in part on the position data of the trailer and the area data of the grain, one or more sampling areas within the trailer for the grain; and
controlling, by the one or more processors, the robot to obtain a sample of the grain from one or more of the one or more sampling areas within the trailer, wherein controlling the robot to obtain a sample of the grain from the one or more of the one or more sampling areas within the trailer comprises controlling, by the one or more processors, the robot to obtain the sample of the grain from the one or more of the one or more sampling areas as the robot moves in a single pass back towards the first end of the trailer from the second end of the trailer.

2. The method of claim 1, wherein the robot comprises one or more of a gantry crane style robot or a robotic arm attached to a monorail, wherein the robot is moveable in three-dimensional space.

3. The method of claim 1, wherein the position data of the trailer comprises one or more of a location of the trailer within the sampling system, coordinates of one or more edges of the trailer, coordinates of one or more obstructions within the trailer, and dimensions of the trailer.

4. The method of claim 1, wherein analyzing the three-dimensional LiDAR model of the trailer comprises:
identifying, by the one or more processors, one or more obstructions within the trailer;
indicating, by the one or more processors, the one or more obstructions in the area data of the grain; and
determining, by the one or more processors, the one or more sampling areas from the area data of the grain such that the one or more obstructions are not included in the one or more sampling areas.

5. The method of claim 4, wherein indicating the one or more obstructions in the area data of the grain comprises removing, by the one or more processors and for each of the one or more obstructions, an area corresponding to the respective obstruction from the area data of the grain.

6. The method of claim 4, wherein indicating the one or more obstructions in the area data of the grain comprises marking, by the one or more processors and for each of the one or more obstructions, an area corresponding to the respective obstruction as unsampleable in the area data of the grain.

7. The method of claim 1, further comprising:
after obtaining the samples, controlling, by the one or more processors, the sampling system to automatically transport the samples to a grading system.

8. The method of claim 1, wherein obtaining the sample of the grain from the one or more of the one or more sampling areas within the trailer comprises obtaining the sample of the grain from each of the one or more sampling areas within the trailer.

9. The method of claim 1, wherein obtaining the sample of the grain from the one or more of the one or more sampling areas within the trailer comprises obtaining the sample of the grain from a random assortment of the one or more sampling areas within the trailer.

10. A sampling system:
a robot comprising a light detection and ranging (LiDAR) sensor system; andone or more processors configured to:
receive an indication that a trailer containing the grain is stationary within the sampling system;
control the robot to capture position data of the trailer and area data of the grain,
wherein capturing the position data of the trailer and the area data of the grain comprises, in response to receiving the indication that the trailer containing the grain is stationary within the sampling system:
initiating a LIDAR scan of the trailer using the robot;
controlling the robot to traverse the length of the trailer during the LiDAR scan to create the three-dimensional LiDAR model of the trailer, wherein controlling the robot to traverse the length of the trailer during the scan comprises controlling the robot to travel a single pass from a first end of the trailer to a second end of the trailer opposite the first end; and
analyzing the three-dimensional LiDAR model of the trailer to determine the position data of the trailer and the area data of the grain;
determine, based at least in part on the position data of the trailer and the area data of the grain, one or more sampling areas within the trailer for the grain; and
control the robot to obtain a sample of the grain from one or more of the one or more sampling areas within the trailer, wherein controlling the robot to obtain a sample of the grain from the one or more of the one or more sampling areas within the trailer comprises controlling the robot to obtain the sample of the grain from the one or more of the one or more sampling areas as the robot moves in a single pass back towards the first end of the trailer from the second end of the trailer.

11. The sampling system of claim 10, wherein the robot comprises one or more of a gantry crane style robot or a robotic arm attached to a monorail, wherein the robot is moveable in three-dimensional space.

12. The sampling system of claim 10, wherein the position data of the trailer comprises one or more of a location of the trailer within the sampling system, coordinates of one or more edges of the trailer, coordinates of one or more obstructions within the trailer, and dimensions of the trailer.

13. The sampling system of claim 10, wherein the one or more processors being configured to analyze the three-dimensional LiDAR model of the trailer comprises the one or more processors being configured to:
   identify one or more obstructions within the trailer;
   indicate the one or more obstructions in the area data of the grain; and
   determine the one or more sampling areas from the area data of the grain such that the one or more obstructions are not included in the one or more sampling areas.

14. The sampling system of claim 13, wherein the one or more processors being configured to indicate the one or more obstructions in the area data of the grain comprises the one or more processors being configured to remove, for each of the one or more obstructions, an area corresponding to the respective obstruction from the area data of the grain.

15. The sampling system of claim 13, wherein the one or more processors being configured to indicate the one or more obstructions in the area data of the grain comprises the one or more processors being configured to mark, for each of the one or more obstructions, an area corresponding to the respective obstruction as unsampleable in the area data of the grain.

16. A non-transitory computer-readable storage medium comprising instructions that, when executed, cause one or more processors of a sampling system to:
   receive an indication that a trailer containing the grain is stationary within the sampling system, the sampling system comprising at least a robot with a light detection and ranging (LiDAR) sensor system;
   control the robot to capture position data of the trailer and area data of the grain, wherein capturing the position data of the trailer and the area data of the grain comprises, in response to receiving the indication that the trailer containing the grain is stationary within the sampling system:
      initiating a LIDAR scan of the trailer using the robot;
      controlling the robot to traverse the length of the trailer during the LiDAR scan to create the three-dimensional LiDAR model of the trailer, wherein controlling the robot to traverse the length of the trailer during the scan comprises controlling the robot to travel a single pass from a first end of the trailer to a second end of the trailer opposite the first end;
      analyzing the three-dimensional LiDAR model of the trailer to determine the position data of the trailer and the area data of the grain;
   determine, and based at least in part on the position data of the trailer and the area data of the grain, one or more sampling areas within the trailer for the grain; and
   control the robot to obtain a sample of the grain from one or more of the one or more sampling areas within the trailer, wherein controlling the robot to obtain a sample of the grain from the one or more of the one or more sampling areas within the trailer comprises controlling the robot to obtain the sample of the grain from the one or more of the one or more sampling areas as the robot moves in a single pass back towards the first end of the trailer from the second end of the trailer.

* * * * *